(12) United States Patent
Garber

(10) Patent No.: US 7,352,771 B2
(45) Date of Patent: Apr. 1, 2008

(54) DATA COLLISION DETECTION DEVICE AND METHOD

(75) Inventor: Richard Stewart Garber, St. Paul, MN (US)

(73) Assignee: Colder Products Company, St. Paul, MN (US)

( * ) Notice: Subject to any disclaimer, the term of this patent is extended or adjusted under 35 U.S.C. 154(b) by 783 days.

(21) Appl. No.: 10/679,946

(22) Filed: Oct. 6, 2003

(65) Prior Publication Data

US 2004/0130438 A1  Jul. 8, 2004

Related U.S. Application Data

(60) Provisional application No. 60/417,357, filed on Oct. 8, 2002.

(51) Int. Cl.
*H04L 12/413* (2006.01)

(52) U.S. Cl. .................. 370/445; 370/252; 375/360; 375/361; 375/282

(58) Field of Classification Search .............. 370/445, 370/447, 242, 252, 446; 375/360, 361, 282
See application file for complete search history.

(56) References Cited

U.S. PATENT DOCUMENTS

| | | | |
|---|---|---|---|
| 4,063,220 A | 12/1977 | Metcalfe et al. | |
| 4,210,780 A | 7/1980 | Hopkins et al. | |
| 4,271,523 A | 6/1981 | Gable | |
| 4,561,091 A | 12/1985 | Scholl et al. | |
| 4,562,582 A | 12/1985 | Tokura et al. | |
| 4,739,328 A | 4/1988 | Koelle et al. | |
| 4,881,059 A | 11/1989 | Saltzberg | |
| 5,162,791 A | 11/1992 | Heegard | |
| 5,199,049 A * | 3/1993 | Wilson | 375/351 |
| 5,287,499 A | 2/1994 | Nemes | |
| 5,543,798 A | 8/1996 | Schuermann | |
| 5,591,951 A | 1/1997 | Doty | |
| 5,619,530 A | 4/1997 | Cadd et al. | |
| 5,627,828 A * | 5/1997 | Lee | 370/445 |
| 5,793,324 A | 8/1998 | Aslanidis et al. | |
| 5,929,779 A | 7/1999 | MacLellan et al. | |
| 5,929,801 A | 7/1999 | Aslanidis et al. | |
| 5,963,557 A * | 10/1999 | Eng | 370/432 |
| 5,965,214 A | 10/1999 | Crossfield et al. | |
| 6,027,027 A | 2/2000 | Smithgall | |
| 6,039,249 A | 3/2000 | Szewczykowski | |

(Continued)

OTHER PUBLICATIONS

Philips Semiconductors ("I*CODE1 Label ICs Protocol Air Interface", Product Specification, Revision 1.5, May 2002).*

(Continued)

*Primary Examiner*—Ricky Q. Ngo
*Assistant Examiner*—Kibrom T Hailu
(74) *Attorney, Agent, or Firm*—Merchant & Gould P.C.

(57) ABSTRACT

A data collision detection device that includes a means for de-modulating at least one carrier signal corresponding to a received modulated subcarrier signal from at least one data transmitter to recover the subcarrier signal from the carrier signal. A microcontroller is operatively connected with the means for recovering a subcarrier signal. The microcontroller includes a means for decoding a recovered subcarrier signal. The means for decoding the recovered subcarrier signal is capable of interpreting signal transitions in the recovered subcarrier signal, and is capable of detecting data collisions in the recovered subcarrier signal when in the presence of a plurality of modulated subcarrier signals.

8 Claims, 5 Drawing Sheets

U.S. PATENT DOCUMENTS

| | | |
|---|---|---|
| 6,054,924 A | 4/2000 | Dames et al. |
| 6,076,007 A | 6/2000 | England et al. |
| 6,097,278 A | 8/2000 | Arnold et al. |
| 6,107,910 A | 8/2000 | Nysen |
| 6,144,300 A | 11/2000 | Dames |
| 6,204,766 B1 | 3/2001 | Crossfield et al. |
| 6,230,972 B1 | 5/2001 | Dames et al. |
| 6,323,769 B1 | 11/2001 | Dames |
| 6,323,770 B1 | 11/2001 | Dames |
| 6,329,916 B1 | 12/2001 | Dames |
| 6,377,203 B1 | 4/2002 | Doany |
| 6,583,717 B1 * | 6/2003 | Amtmann ........... 340/10.1 |
| 6,625,464 B1 * | 9/2003 | Bandy et al. ........... 455/503 |
| 6,757,324 B2 * | 6/2004 | Fitzrandolph ........... 375/147 |
| 2002/0024421 A1 * | 2/2002 | Kang ........... 340/10.2 |
| 2003/0001009 A1 | 1/2003 | Collins et al. |

OTHER PUBLICATIONS

"Identification cards—Contactless integrated circuit(s) cards—Vicinity cards—Part 1: Physical characteristics," International Standard ISO/IEC 15693-1, First edition, Jul. 15, 2000.

"Identification cards—Contactless integrated circuit(s) cards—Vicinity cards—Part 2: Air interface and initialization," International Standard ISO/IEC 15693-2, First edition May 1, 2000.

"Identification cards—Contactless integrated circuit(s) cards—Vicinity cards—Part 3: Anticollision and transmission protocol," International Standard ISO/IEC 15693-3, First edition Apr. 1, 2001.

"Identification cards—Contactless integrated circuit(s) cards—Proximity cards—Part 1: Physical characteristics," International Standard ISO/IEC 14443-1, First edition Apr. 15, 2000.

"Identification cards—Contactless integrated circuit(s) cards—Proximity cards—Part 2: Radio frequency power and signal interface," International Standard ISO/IEC FDIS 14443-2, Final Draft, 2000.

"Identification cards—Contactless integrated circuit(s) cards—Proximity cards—Part 3: Initialization and anticollision," International Standard ISO/IEC 14443-3, First edition Feb. 2001.

"I Code1 Label Ics Protocol Air Interface," Integrated Circuits, Data Sheet, Product Specification Revision 1.5, Philips Semiconductors, May 2002.

"SL1 ICS 30 01 I Code1 Label IC Chip Specification," Integrated Circuits, Data Sheet, Product Specification Revision 2.1, Philips Semiconductors, May 2, 2000.

"I Code SL RC 400 I Code Reader IC," Integrated Circuits, Data Sheet, Product Specification Revision 2.0 Preliminary, Philips Semiconductors, Nov. 2001.

* cited by examiner

DATA COLLISION DETECTION DEVICE AND METHOD

CROSS REFERENCE TO RELATED APPLICATION

This application claims the benefit under Title 35, United States Code § 119(e), of U.S. Patent Provisional Application Ser. No. 60/417,357, filed Oct. 8, 2002 and entitled "Data Collision Detection Device and Method for the Same," which is hereby incorporated by reference in its entirety.

FIELD OF THE INVENTION

This invention generally relates to a device for decoding received data signals from data transmitters and a method for detecting data collisions from a multitude of received data signals. More particularly, this invention is related to a data collision detection device and method for detecting data collisions for use in radio frequency identification (RFID) tag interrogator devices.

BACKGROUND OF THE INVENTION

Devices employing capabilities for detecting and sorting data collisions in transmitted signals have been known and are widely used. One example of this is implemented in systems using interrogators or read/write devices that decode data transmitted from a transponder such as, for example, radio frequency identification tags (RFID tags) used in high frequency RFID systems. In some well-known methods, existing interrogators recover and integrate a subcarrier signal modulated by a low frequency bitstream, typically yielding an original bitstream with a data rate of 26.48 kb/s. This low frequency bitstream is fed to a multi-bit analog to digital converter (ADC). The converted signal is decoded by a microcontroller/processor and the data then can be transmitted to a host computer. As the bitstream prior to conversion is analog (i.e. the maximum and minimum values will vary depending on variables such as transmitted radio frequency (RF) power, environmental noise and number of RFID tags in the field), it is possible with this method to determine a number of characteristics of the system, including whether a data collision has taken place, and whether variables in the system require adjustment in order to obtain optimal operating conditions.

However, existing designs and methods can require additional filtering and amplification to convert the subcarrier signal to a baseband signal. As above, the baseband signal typically is converted to a digital signal by an analog to digital converter (ADC), and the converted signal is then analyzed and the appropriate output is generated.

These additional stages for converting the signal so that it may be decoded can result in slower performance in the communication, for instance, between an interrogator and an RFID tag, and more particularly can result in slower detection of the occurrence of data collisions.

Although these devices may be suitable for their intended uses, improvements may still be made in providing a device employing data collision detection capabilities where it is not necessary to adjust the RF output power, as the desired reading range or read/write distance remains generally constant. Particularly, there is a need for a data collision detection device and method for detecting data collisions where transmitted data can be directly decoded from a recovered subcarrier signal. Further, there is a need to provide a more compact and more cost efficient design for decoding transmitted data and for detecting data collisions at an earlier stage, for instance, by eliminating the need for an analog to digital converter in such systems.

SUMMARY OF THE INVENTION

In accordance with the present invention, improvements upon existing designs for detecting data collision and for decoding signals received from data transmitters have been made by providing data collision detection devices that can recover a modulated subcarrier signal from at least one received modulated carrier signal, and that can interpret the recovered subcarrier signal to detect the presence of data collisions and the presence of multiple responding data transmitters.

In one embodiment of the present invention, a data collision detection device includes a means for de-modulating at least one modulated carrier signal corresponding to a received signal from at least one data transmitter to recover a subcarrier signal from at least one carrier signal. A microcontroller is operatively connected with the means for de-modulating a subcarrier signal. The microcontroller includes a means for decoding the recovered subcarrier signal recovered by the means for recovering a subcarrier signal.

Preferably, the means for decoding the recovered subcarrier signal is capable of interpreting signal transitions in the recovered subcarrier signal, and is capable of detecting data collisions in the recovered subcarrier signal when in the presence of a plurality of modulated subcarrier signals. More preferably, a sorting means may be operatively connected with the microcontroller, and is operable for sorting from a plurality of data transmitters that are detected in the recovered subcarrier signal.

Preferably, data transmitted from a transponder is directly decoded from the recovered subcarrier signal.

Preferably, the data collision detection device is constructed and configured such that data collisions can be detected.

In one embodiment of the present invention, the data collision detection device is implemented in an interrogator or read/write device.

Preferably, the data collision detection device is constructed and configured for decoding data in the form of radio frequency signals from at least one radio frequency identification tag. More preferably, such RFID tags modulate the interrogating radio frequency field at a rate of 13.56 MHz/32 or 423.75 kHz. The data collision detection device may also be used with RFID tags that modulate the interrogating RF field at a rate of 13.56 MHz/x, where x is an integer greater than 1, or at multiple modulation rates.

In one embodiment of the present invention, a fluid coupling system includes connectors that have an interrogator implemented with the data collision detection device, where the data collision detection device is connected with at least one coupling half in the system, thereby facilitating proper connection with a mating coupling half having a transponder or tag.

Using the means for de-modulating the received carrier signal from at least one data transmitter, the received carrier signal is de-modulated to provide the subcarrier signal. A facsimile of the recovered subcarrier signal is transferred to the microcontroller, and the microcontroller decodes the recovered subcarrier signal using a means therefor. The means for decoding the recovered subcarrier signal interprets signal transitions in the recovered subcarrier signal.

Data collisions resulting from multiple responding data transmitters can be detected using the decoded recovered subcarrier signal.

In one embodiment, when data collisions are detected, a sorting means can sort through the multiple responding data transmitters. Preferably, the sorting means includes a sorting algorithm, implemented in firmware by the microcontroller, and is capable of sorting multiple responding data transmitters detected in the recovered subcarrier signal.

Embodiments of the present invention provide a data collision detection device that can operate where the read/write distance remains relatively constant, and has simplified circuitry for demodulating and recovering the subcarrier signal. Further, as the data signal received from the data transmitter is directly decoded from the recovered subcarrier modulated signal, a multi-bit analog to digital converter, used for instance in existing devices, is not needed. In this configuration, data collisions can be detected more quickly and conveniently without the need for such an analog to digital converter. Further, this configuration also saves space needed for such devices.

A variety of additional advantages will be set forth in part in the description which follows. It is to be understood that both the foregoing general description and the following detailed description are exemplary and explanatory only and are not restrictive of particular aspects of the invention disclosed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the illustrated embodiments, reference is made to the accompanying drawings that form a part hereof. It is to be understood that other embodiments may be utilized as structural changes may be made without departing from the spirit and scope of the present invention.

Figure 1:
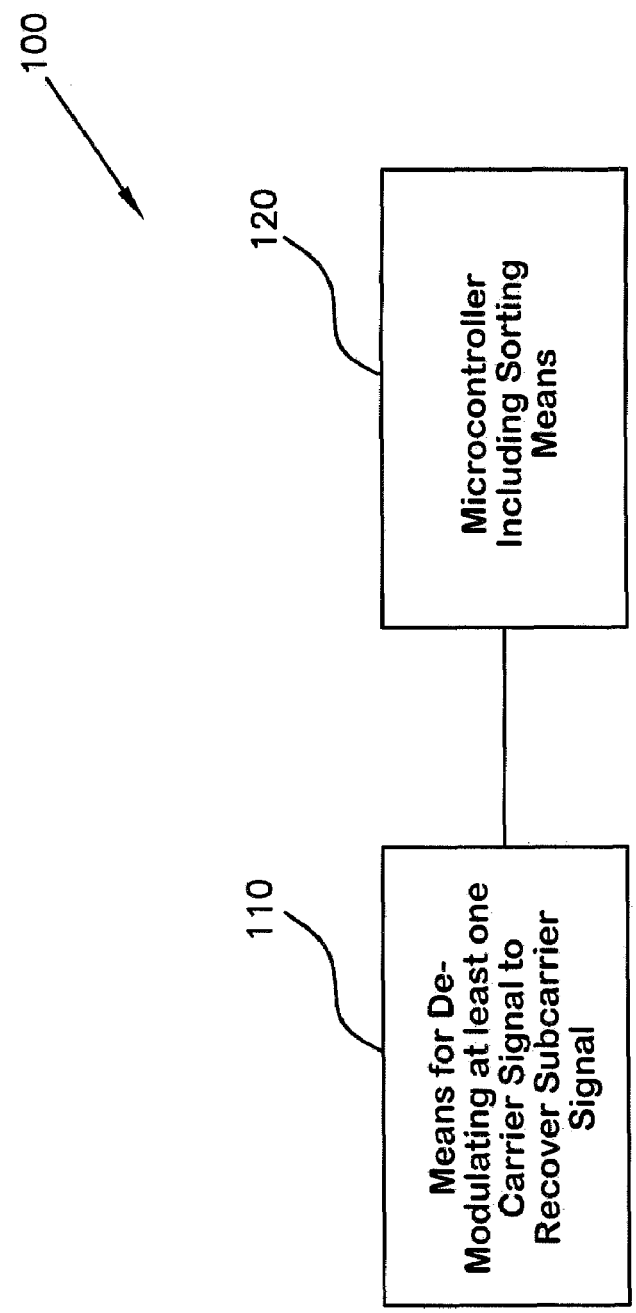
FIG. 1 represents a schematic view of one embodiment of a data collision detection device in accordance with the principles of the present invention.

FIG. 1 illustrates one embodiment of a data collision detection device 100. The data collision detection device includes a means for de-modulating at least one carrier signal 110 in providing a subcarrier signal.

Preferably, in one illustrated embodiment the carrier signal(s) is received from transmitters or transponders such as RFID tags, and represents data contained in the tag. In one example, an amplitude shift keying modulator circuit, implemented for instance in an RFID tag, is activated where a control signal is applied to the output stage in providing a modulated subcarrier signal from the carrier signal(s) to an interrogator (further discussed below in FIG. 3).

The de-modulating means 110 recovers a subcarrier signal from the carrier signal(s). Preferably, the means 110 includes the subcarrier signal being sent through an AM detector and filter such that the subcarrier signal is preserved. Preferably, the recovered subcarrier signal is at a frequency of 423.75 kHz, and is input to a comparator to obtain a microcontroller compatible subcarrier signal that is fed directly to the input port of a microcontroller at 120 operatively connected with the means 110. It will be appreciated that the recovered subcarrier signal also can be input to a second comparator that has its set-point adjusted independently to control reader sensitivity for determining whether an RFID tag is within the read/write device or interrogator range.

The microcontroller preferably, but need not, includes a sorting means. It will be appreciated the sorting means may be any well known implemented sorting algorithm in firmware (or hardware) of an interrogator or read/write device, and it also will be appreciated that such firmware may be modified as needed for implementation of the sorting algorithm. One example of such a sorting algorithm is described in Philips Semiconductors' "I*CODE1 System Design Guide," Revision 1.0, Apr. 17, 2000 and in "I*CODE1 Label ICs Protocol Air Interface," Products Specification, Revision 1.4, Dec. 1, 1999. Once a data collision is detected, the sorting algorithm is used to sort through the multiple RFID tags. Sorting includes a "guessing game" employing hashing of the various RFID tags' serial numbers as the read/write device interrogates the RFID tags for a response. The capability of the tags to answer either generally or to a specific query used in the sorting algorithm enables sorting of multiple responding tags after data collision is detected.

Figure 2:
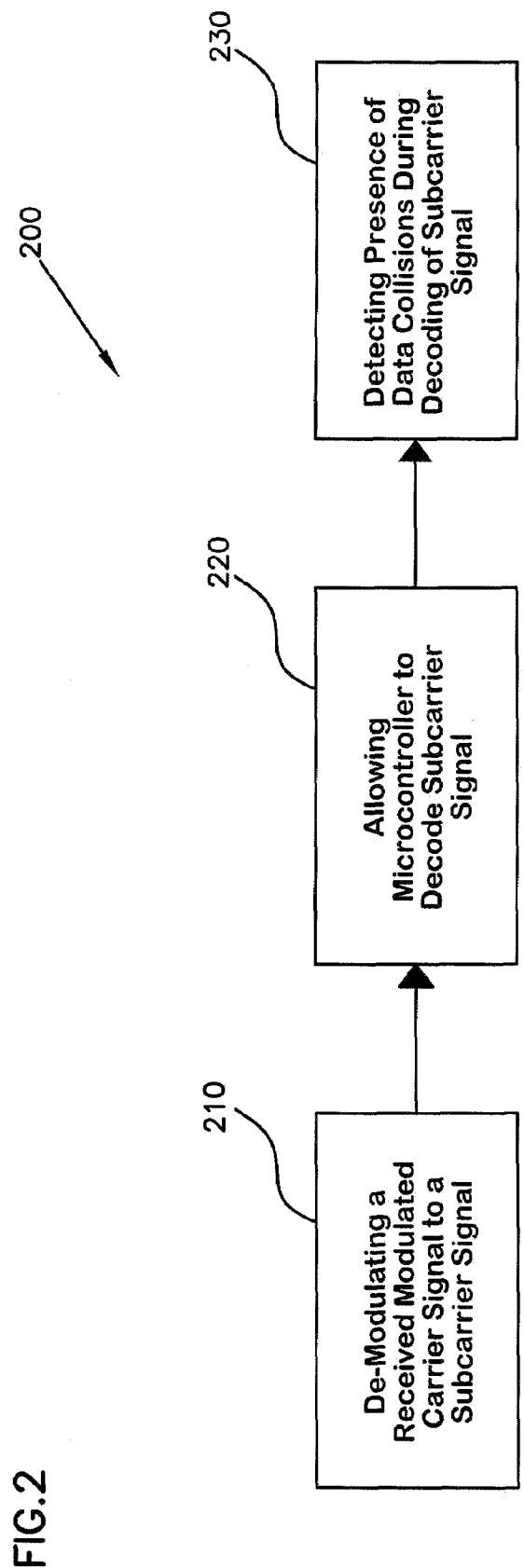
FIG. 2 represents a block diagram of one embodiment of a method for detecting data collisions in accordance with the principles of the present invention.

FIG. 2 illustrates a schematic block diagram for a method 200 of detecting data collisions. Preferably, a data collision detection device such as 100 described above is used to implement the method 200. In the method 200, received modulated carrier signal(s) are de-modulated to provide a subcarrier signal at 210 using the means for de-modulating a carrier signal. Preferably as above, this is accomplished by sending the subcarrier signal through an AM detector and filter so that the subcarrier signal will be preserved.

The subcarrier signal is transferred to a microcontroller at 220 and the microcontroller decodes the subcarrier signal. Preferably, the microcontroller decodes the subcarrier signal by interpreting signal transitions in the recovered subcarrier signal in a window of time immediately preceding and adjacent to a bit center and in a window of time adjacent to and immediately following the bit center. Using the results from decoding of the subcarrier signal, data collisions resulting from a plurality of answering data transponders can be detected at 230.

In this configuration, data collisions can be identified by directly decoding the recovered subcarrier signal, thereby detecting data collisions more quickly. Further, in this configuration improved performance between a transmitter (e.g., RFID tag) and an interrogator (read/write device) can be realized, as no additional stages for amplification and filtering are required, and the need for a multi-bit analog to digital converter can be eliminated.

In the event data collisions are detected, a sorting algorithm can be implemented, as described above, to sort multiple RFID tags found in the decoded recovered subcarrier signal, thereby properly completing data transmission between the read/write device and data transponder.

Figure 3:
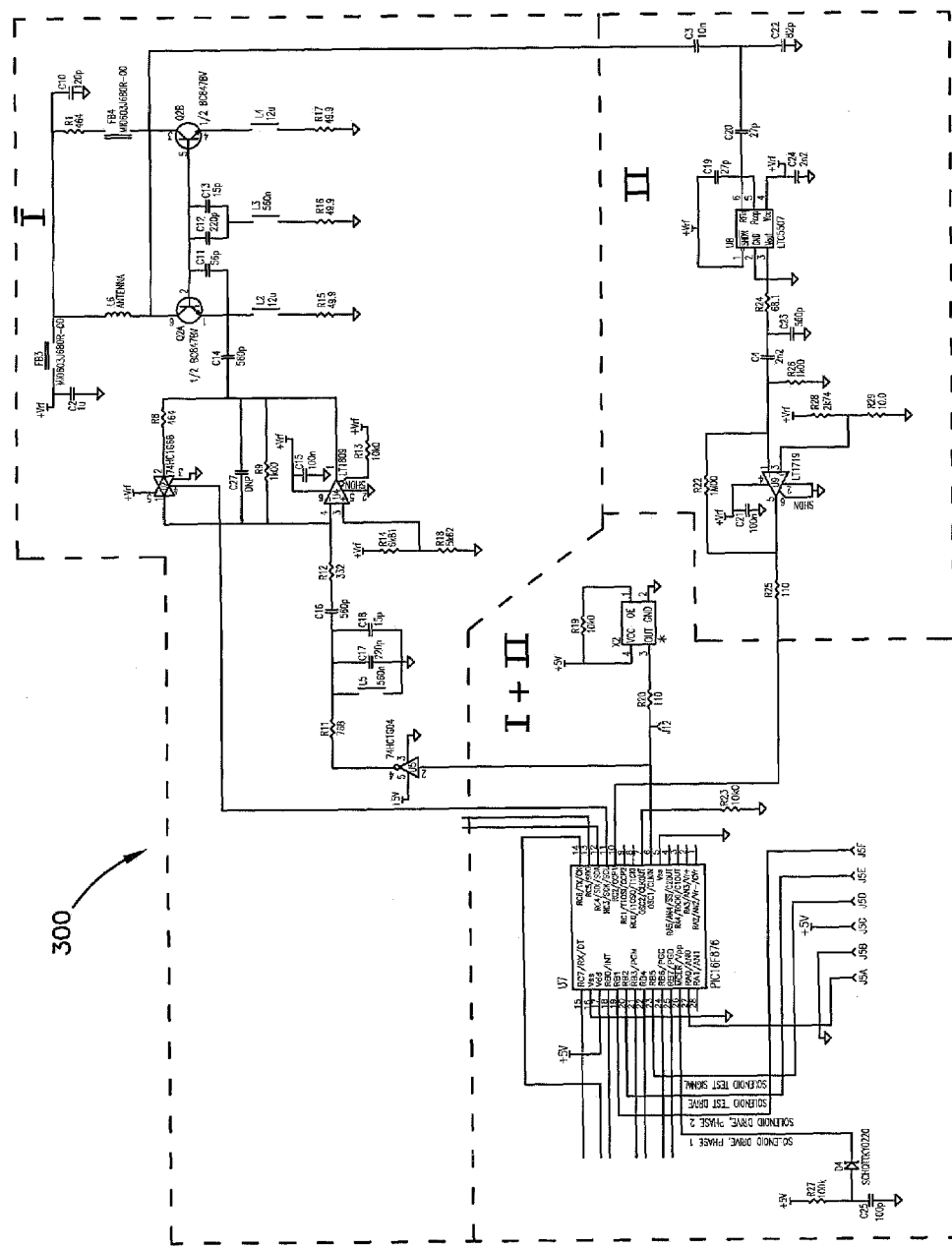
FIG. 3 represents a schematic view of one preferred embodiment of components in a radio frequency identification (RFID) interrogator (a.k.a. RFID reader) circuit board in accordance with the principles of the present invention.

FIG. 3 illustrates one preferred example of the components and operation of a circuit 300 for a circuit board used in an RFID tag interrogator with data collision detection, such as 100 above. The circuit 300 includes a portion I providing capability for transmission of data and commands to a transponder or tag (e.g., RFID tag). Additionally, the circuit 300 includes a portion II providing capability for receiving and de-modulating data encoded by the modulated subcarrier signal(s). Preferably, portion II forms a part of the data collision detection device, and is implemented in an interrogator or RFID tag read/write device (a.k.a. RFID tag reader). Preferably, the interrogator operates at a read/write range of more than 0.2 cm, and can operate at longer ranges of up to 1.5 m.

More preferably, the interrogator may be employed in, but not limited to, fluid coupling systems for identifying and confirming proper connections, such as between connector/coupling halves. One example of such a fluid coupling system is disclosed in U.S. patent application Ser. No. 10/153,361 to Garber et al., filed on May 21, 2002 and entitled "Connector Apparatus and Method for Connecting the Same for Controlling Fluid Dispensing," which is herein incorporated by reference in its entirety. In this field, the interrogator preferably is disposed on a connector half, and interrogates RFID tags disposed on potential corresponding connectors within range of the interrogator. The interrogator, using the data collision detection device as described, determines the presence of data collisions. It will be appreciated that the interrogator also may be employed in process control systems, other than fluid dispensing, to which the interrogator may be needed and can be suitably adapted with.

In operation, a clock X2 (see FIG. 3) continuously supplies a 13.56 MHz square wave signal to inverter U5. U5 outputs a buffered square wave that is filtered to a sinusoid by the bandpass filter that includes the components R11, L5, C17, C18, C16, and R12. The sinusoid is applied to the Amplitude Shift Keying (ASK) modulator circuit U2 and U4 and associated components. It will be appreciated that the modulator modulates the amplitude of the carrier frequency in a manner such that an RFID tag can understand the modulations as combinations of native commands and/or data. With no modulation selected, the ratio of R9 to the impedance comprised of the above bandpass filter components effectively set the gain. When modulation is desired, a control signal is applied to U2. This connects R9 and C27 in parallel with R8, thus reducing the gain of the ASK modulator, thereby having the desired effect of modulating the amplitude of the 13.56 MHz RF signal. This signal is then coupled to the output stage via C14.

The output stage is a low-pass, common base amplifier. The output stage is comprised of Q2 and associated components. Variation of the values of components C14, L6, L2, R15, C11, C12, C13, L3, R16, L4, R17, and R1 affect the frequency response and baseband voltage gain of the amplifier. The unloaded impedance presented to the current mirror by the antenna, L6, determines the values required for the aforementioned components. It will be appreciated that the antenna L6 is common with both portion I and portion II of the circuit 300. The antenna current is roughly the ratio of the signal on the right-hand side of C14 (hence, the reference voltage) and R16, and the antenna voltage is the product of the antenna current and the antenna impedance.

Therefore, when the ASK modulator is activated, the reference voltage to the output stage modulates the antenna current (therefore, the antenna's RF magnetic field) resulting in the antenna voltage at the junction of Q2A pin 6, L6, and C3 also being modulated. Also, when an RFID tag attempts to modulate the RF field at the subcarrier frequency in response to the read/write device, it does so by reducing the antenna impedance via mutual inductance, which reduces the antenna signal at the junction of Q2A pin 6, L6, and C3. This modulation may be easily detected. Theoretically, the antenna load impedance can be reduced to nearly zero, while maintaining circuit stability. Such a situation would be caused by having numerous RFID tags in the read/write device's RF field, namely a condition where data collision detection may be needed. Preferably, an RFID tag(s) or transponder(s) modulates the interrogating RF field at a rate of 13.56 MHz/32 or 423.75 kHz. It will be appreciated that this method can be implemented with other RFID systems that use different sub-carrier frequencies (e.g. $f_c/16$, $f_c/32$, $f_c/28$, $f_c/128$) and/or multiple sub-carriers.

It will be appreciated that parameters that may affect the operating range of the circuit 300 include the amplitude of the reference signal supplied by U4 via C14 to the current mirror. Further, the operating range of the system can be affected by the antenna diameter of the interrogator and the antenna diameter of the tag. The operating range also may be affected by the gain and frequency response as determined by C14, L6, L2, R15, C11, C12, C13, L3, R16, L4, R17, and R1. The selection of the output transistor, Q2, can have a large effect on the power consumption based on its transfer characteristics, hence biasing requirements.

An AM detector (demodulator) includes components C22, C20, C19, RC24, U8, R24, C23, C4 and R26. The signal from the junction of Q2A.6, L6, and C3 is coupled into the detector via C3. Detection, amplification, and some filtering of the resulting subcarrier signal are performed by U8. Further required band-pass filtering is performed by R24, C23, C4 and R26. This signal is then applied to comparator U9 to recover a microcontroller-compatible subcarrier signal. The signal produced by U9 is then fed to a microcontroller where it is decoded. Operation of the microcontroller for decoding the subcarrier signal is further discussed in the following descriptions.

Preferably in detecting data collisions, the modulation created by the RFID tag uses a Manchester bit-coding modulation scheme as outlined, for instance, in International Standard ISO/EEC 15693, First Edition 2000-05-01. The communications protocol between the read/write device and the RFID tag is a framed synchronous, serial format. In this particular format, subcarrier modulation during the first half of a bit frame represents a logic "0" and subcarrier modulation in the last half of the frame represents a logic "1". A preferred embodiment uses a "majority rules" method to decode the subcarrier modulation, where the microcontroller (or digital logic) looks at the recovered subcarrier signal in two windows of time of equal and predetermined length centered on the bit frame. Preferably as above, the microcontroller decodes the recovered subcarrier signal by interpreting signal transitions in the recovered subcarrier signal in a window of time immediately preceding and adjacent to a bit center and in a window of time adjacent to and immediately following the bit center. Preferably, the clock used to drive the microcontroller (logic) is a multiple or submultiple of the clock used to provide the RF field to guarantee synchronization.

Based on the modulation timing specifications of known RFID tags, if the microcontroller detects more transitions in the first half of the bit frame than the last half of the bit frame, a "0" has been transmitted by the RFID tag. On the other hand, if a greater number of transitions are detected in the last half of the bit frame, a "1" has been transmitted. If the number of transitions detected in the first and last half are within one or equal in number and the microcontroller receives the appropriate signal indicating that tags are present in the read/write device's field, then an assumption may be made that multiple tags are attempting to answer the read/write device. This coding scheme would be true for an ISO 15693 compliant RFID tag. Other systems, such as the Philips I*CODE system, use coding schemes where "0" is represented by transitions in the last half of the bit frame and "1" is represented by transitions in the first half of the bit frame. Embodiments of the present invention are intended to detect the presence of multiple RFID tags in what is preferably a single-tag system.

Data collision detection can be implemented in firmware of a read/write device, such as an RFID interrogator. This is executed by the microcontroller U7. The microcontroller U7 gets its data signal at pin 10 via R25 from the comparator U9.

It will be appreciated that digital logic means also may be implemented for providing the microcontroller function. For example, field programmable gate arrays (FPGAs) can also be used.

It will be appreciated that existing analog hardware in such RF systems is sufficient to allow implementation of data collision detection. A sorting algorithm can be added to firmware in the microcontroller. As above, it will be appreciated that a sorting algorithm may be implemented in firmware, and may be as described in Philips Semiconductors' "I*CODE1 System Design Guide," Revision 1.0, Apr. 17, 2000 and In "I*CODE1 Label ICs Protocol Air Interface," Products Specification, Revision 1.4, Dec. 1, 1999.

Referring more particularly to FIG. 3, a clock and clock distribution includes a clock integrated circuit X2, R19 is a pull-up resistor, and R20 is a series termination resistor for the output line. U5 is a buffered inverter. Miscellaneous components R27, D4, and C26 are required for proper reset timing and for implementation of the in-circuit serial programming function of U7 to permit field updates of firmware. FB4 and FB7 are for noise suppression on their associated control lines.

Figure 4:
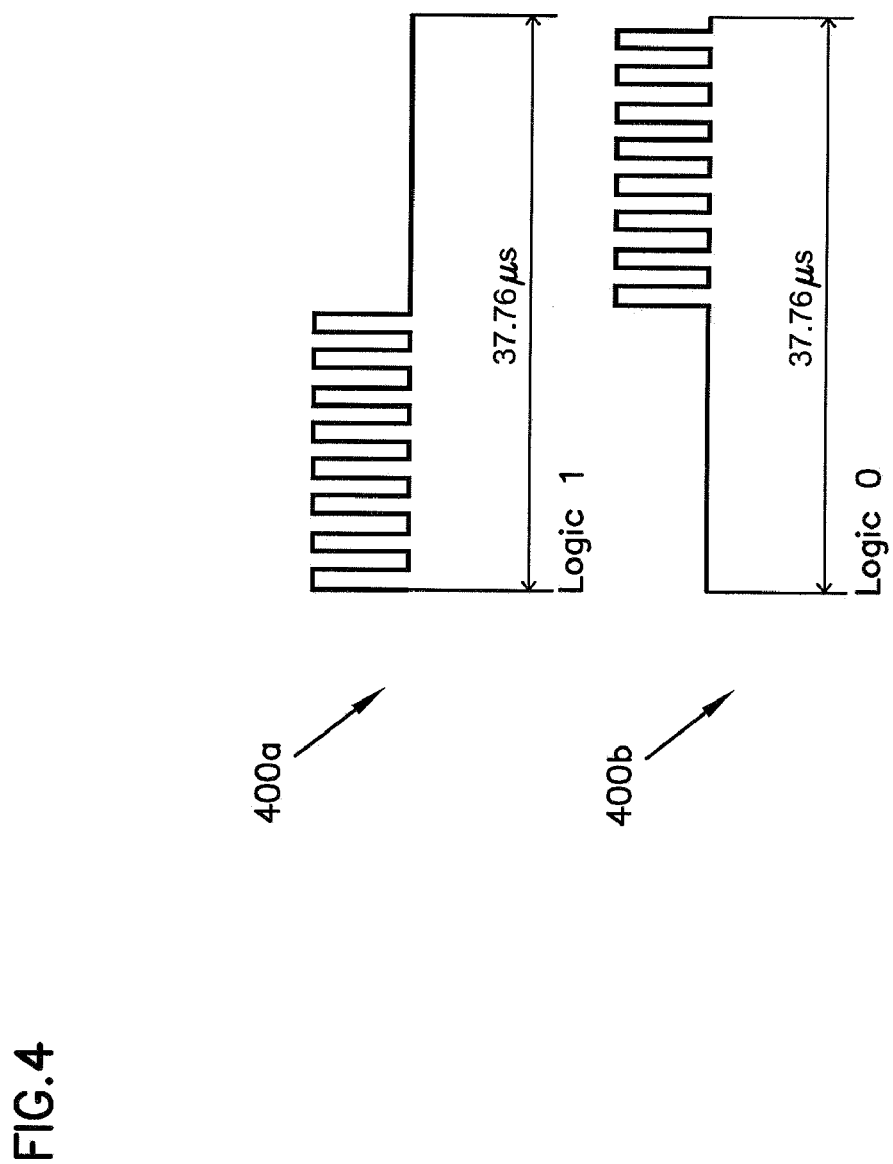
FIG. 4 represents a schematic view of one embodiment of a Manchester coded subcarrier signal.

As above, FIG. 4 illustrates one embodiment of bit coding according to the above principles. Specifically, FIG. 4 illustrates an example of bit coding according to Philips' I*CODE Protocol Air Interface, Revision 1.3, April 1999. Other examples illustrating variations of the same principle can be found in ISO/IEC 15693-2: 2000 (FIGS. 10 and 11), which use a bit coding scheme where "0" is represented by transitions in the first half of the bit frame and "1" is represented by transitions in the last half of the bit frame. Preferred embodiments can be configured so as to allow interrogation of all RFID tags. Preferably, the example data collision detection device can be configured to allow for a multi-protocol interrogator recognizing multiple bit coding schemes.

Data decoding is preferably implemented as follows. In one preferred embodiment, data is transmitted from transponder or tag to an interrogator in a synchronous serial format. It will be appreciated that the interrogator or read/write device can reference where in time a bit must begin and where a bit must end. Further, the interrogator can determine where the temporal center of the bit must be. Thus, if the microcontroller "looks" for recovered sub-carrier signal transitions in a window of time immediately preceding and adjacent to the bit-center and then "looks" for recovered sub-carrier signal transitions in an equal length window of time adjacent to and immediately following the bit-center, the microcontroller can determine the value of the bit (0 or 1) in any given valid bit position, and can determine the tag to interrogator interface. The possible states include the following as illustrated in the table below.

| State No. | State Description | Interpretation |
|---|---|---|
| 1 | many transitions preceding and no transitions following the bit center | logic 1 (FIG. 4, 400a) |
| 2 | no transitions preceding and many transitions following the bit-center | logic 0 (FIG. 4, 400b) |
| 3 | no transitions preceding or following the bit-center | no tag present or within interrogator range |
| 4 | many transitions preceding and some transitions following the bit center within ⅛ of a bit period | logic 1 with allowable system skew |
| 5 | some transitions preceding within ⅛ of a bit period and many transitions following the bit-center | logic 0 with allowable system skew |
| 6 | number of transitions preceding and following the bit-center are equal | system failure, or tag collision with multiple tags attempting to "answer" the interrogator simultaneously |

In one example of actual use, embodiments of the present invention can be constructed and configured where the gains and cut-off frequencies of the demodulator/amplifier/filter section can be configured such that a data collision can be detected of at least two simultaneously responding RFID tags, as stated in the state 6 above. It will be appreciated that system parameters can be varied such that a data collision between at least two and among more than three tags can be detected.

The direct decoding of subcarrier data provides an improvement over existing designs. In the known solution, further filtering takes place to recover the baseband signal, which is then converted to a microcontroller compatible signal by an ADC. The additional stages employed by the known solution can result in slower detection of a collision, as well as over-all slower performance in interrogator to RFID tag communications.

Figure 5:
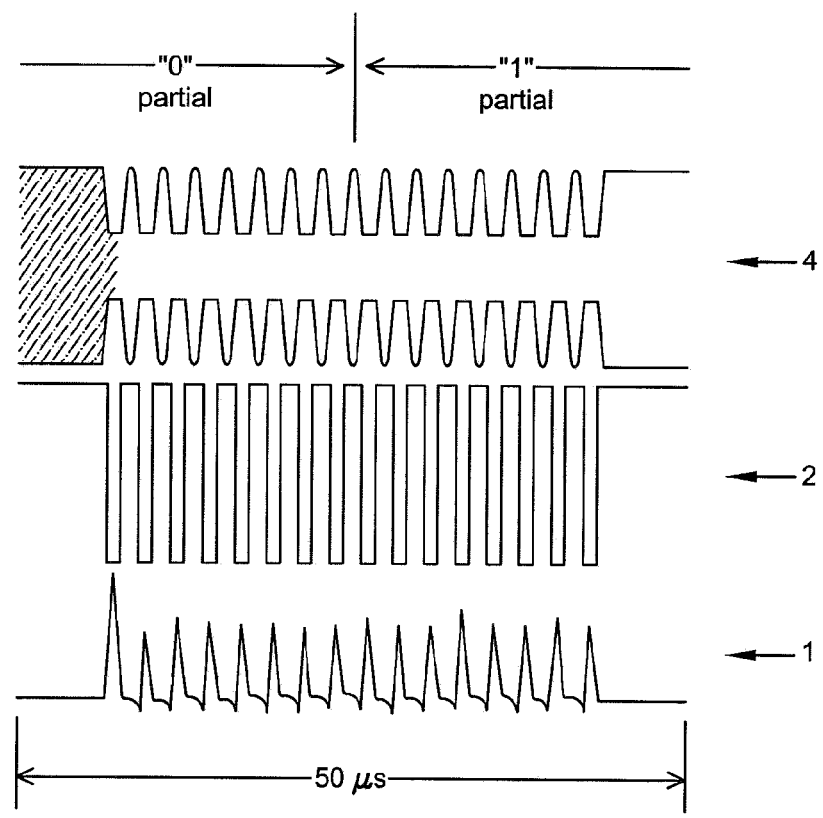
FIG. 5 represents a schematic view illustrating various signals obtained at points in a preferred embodiment of the invention, showing a modulated carrier signal, an analog pulse train representing a demodulated subcarrier signal, and a microcontroller compatible digital signal.

FIG. 5 illustrates one embodiment of different formats of a signal transmitted from a transponder using example principles of the present invention. Particularly, FIG. 5 shows a bitmap including a load modulated carrier signal 4 (modulated by the RFID tag), an analog pulse train representing a recovered subcarrier signal 1, and a microcontroller compatible digital signal 2.

The signals shown represent a 50 µs period within two consecutive bits. The leading bit is a logic 0 and the trailing bit is a logic 1. Signal 4 is the signal at the RFID tag, 13.56 MHz modulated with a 423.75 kHz signal. Signal 1 is the analog signal observed at, for instance, the junction of R24, C4, and C23 after it has been rectified, filtered, and amplified by U8 and associated components (FIG. 3). This is a pulse train representing the recovered sub-carrier signal. The analog amplitude at this point is a function of gain, filter cut-off frequencies, and interrogator to RFID tag distance (e.g., signal strength). Signal 2 is the digital signal at pin 5 of U9. U9 is a comparator that converts the analog pulse train to the microcontroller compatible digital Signal 2.

Preferably, a carrier frequency of 13.56 MHz in an RFID system is used. It will be appreciated that preferred embodiments of the present invention are compatible with tags described by ISO/IEC 15693-2:2000, using a single sub-carrier, high data rate. It will also be appreciated that adaptation to other ISO/IEC 15693 modes or ISO/IEC 18000 compatible systems is a matter of modifying firmware. Preferably, an RFID tag (a.k.a. the transponder) modulates the interrogating RF field at a rate of 13.56 MHz/32 or 423.75 kHz. The data transmitted by the transponder is organized into frames. Preferably as above, embodiments of the present invention are designed to be compatible with ISO/IEC 15693 and ISO/IEC 18000 Mode 1 compliant RFID tags. Further, the firmware could be modified to make it compatible with ISO/IEC 14443 tags (cards) as well. It will be appreciated that modifications as needed may be made to implement principles of the present invention with such applications.

It will be appreciated that preferred embodiments of the present invention are implemented in RFID systems that employ a single subcarrier frequency, and also may be adaptable with dual subcarrier systems. For example as above, this method can be implemented with other RFID systems that use different sub-carrier frequencies (e.g. $f_c/16$, $f_c/32$, $f_c/28$, $f_c/128$) and/or multiple sub-carriers.

As above, the algorithm that is used in this embodiment of the invention to decode the data from the subcarrier works as follows. The microcontroller counts signal transitions at its input port within a predetermined window of time centered on the 37.76 µs bit frame. If the number of counts prior to the center is much greater than the number of counts past the center, a logic 0 is assumed (400b, FIG. 4). If the number of counts past the center is much greater than the number of counts prior to the center, a logic 1 is assumed (400a, FIG. 4). If the number of counts prior to and past the center of the bit frame is within one count or equal to one another, the data is assumed to be invalid. In the present embodiment this could occur due to a framing error or the absence of an RFID tag in the interrogator's field (both counts would equal zero).

By properly adjusting the set-point of the comparator, it is possible to determine whether multiple RFID tags are within the interrogator's field. Then, when the number of counts prior to and past the center of the bit frame are equal, the assumption can be made that a data collision has occurred—one tag has answered with a "0" simultaneously with another tag answering with a "1". When the collision has been detected, a sorting means can be implemented to sort the multiple tags.

As above, embodiments of the present invention can provide advantages of a data collision detection device that can operate over a short range of distances where the read/write distance between the reader and each of several tags remains relatively constant, or where the transmitted RF power is not adjustable, and has simplified circuitry for detecting data collisions. Further, as the data signal received from the data transmitter is directly decoded from the recovered subcarrier modulated signal, an analog to digital converter is not needed. In this configuration, for instance, data collisions can be detected more quickly and conveniently without the need for an analog to digital converter. Further, this configuration also saves space needed for such devices.

Although preferred embodiments disclosed herein are described in conjunction with an RFID system, embodiments of the present invention can also be used with other synchronous serial communication systems as well.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is:

1. A data collision detection device for decoding received signals from data transmitters, comprising:
   a means for de-modulating at least one modulated carrier signal corresponding to a received signal from at least one data transmitter; and
   a module operatively coupled with the means for de-modulating, the module including a means for decoding a recovered subcarrier signal recovered from the means for de-modulating, the means for decoding the recovered subcarrier signal being capable of interpreting signal transitions in the recovered subcarrier signal and being capable of detecting a data collision within the recovered subcarrier signal in the presence of a plurality of modulated carrier signals detected in the recovered subcarrier signal;
   wherein the means for decoding a recovered subcarrier signal includes a means for counting a number of transitions before and after a bit-center of the recovered subcarrier signal; and
   wherein the means for decoding a recovered subcarrier signal is configured to detect a data collision when the number of transitions before the bit-center and the number of transitions after the bit-center are substantially equal.

2. A data collision detection device for decoding received signals from data transmitters, comprising:
   a module configured to de-modulate at least one modulated carrier signal conesponding to a received signal from at least one data transmitter to recover a subcarrier signal from the carrier signal; and
   a microcontroller operatively coupled to the module, the microcontroller being configured to count a number of transitions before and after a bit-center of the subcarrier signal and thereby detect a data collision;
   wherein the microcontroller is configured to detect a data collision when the number of transitions before the bit-center and the number of transitions after the bit-center are substantially equal.

3. A method for detecting data collisions using a data collision detection device, comprising:
   de-modulating a received signal to recover a subcarrier signal;
   decoding the recovered subcarrier signal to interpret signal transitions in the recovered subcarrier signal; and
   detecting a presence of data collisions in the recovered subcarrier signal, including:
     determining a bit-center;
     counting a number of transitions before and after the bit-center; and
     determining the presence of data collisions when the number of transitions before the bit-center and the number of transitions after the bit-center are substantially equal.

4. The method of claim 3, wherein the step of decoding the recovered subcarrier signal further comprises:
   determining a bit-center;
   measuring a number of transitions before and after the bit-center;
   detecting a logic 1 when the number of transitions before the bit-center is substantially greater than the number of transitions after the bit-center; and detecting a logic 0 when the number of transitions after the bit-center is substantially greater than the number of transitions before the bit-center.

5. The method of claim 3, further comprising sorting signals transmitted from a plurality of data transmitters that are detected in the recovered subcarrier signal.

6. A method for detecting data collisions, comprising:

providing a data collision detection device including a means for de-modulating a received signal corresponding to at least one carrier signal from at least one data transmitter to recover a subcarrier signal from the received signal, and a microcontroller operatively connected with the means for de-modulating and including a means for decoding the subcarrier signal;

de-modulating the received signal to the subcarrier signal using the means for de-modulating the received signal to recover the subcarrier signal;

transferring the recovered subcarrier signal to the microcontroller;

decoding the recovered subcarrier signal using the means for decoding the recovered subcarrier signal to interpret signal transitions in the recovered subcarrier signal; and detecting the presence of data collisions resulting from the decoding and interpretation of the recovered subcarrier signal, including:

determining a bit-center;

measuring a number of transitions before and after the bit-center; and determining the presence of data collisions when the number of transitions before the bit-center and the number of transitions after the bit-center are substantially equal.

7. The method of claim 6, wherein the step of decoding the recovered subcarrier signal further comprises:

determining a bit-center;

measuring a number of transitions before and after the bit-center;

detecting a logic 1 when the number of transitions before the bit-center is substantially greater than the number of transitions after before the bit-center; and detecting a logic 0 when the number of transitions after the bit-center is substantially greater than the number of transitions before the bit-center.

8. The method of claim 6, further comprising sorting signals transmitted from a plurality of data transmitters that are detected in the recovered subcarrier signal.

* * * * *